(12) United States Patent
Cho et al.

(10) Patent No.: US 9,620,786 B2
(45) Date of Patent: *Apr. 11, 2017

(54) METHOD FOR FABRICATING CORE-SHELL PARTICLES AND CORE-SHELL PARTICLES FABRICATED BY THE METHOD

(71) Applicant: LG CHEM, LTD., Seoul (KR)

(72) Inventors: Jun Yeon Cho, Daejeon (KR); Sang Hoon Kim, Daejeon (KR); Gyo Hyun Hwang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/362,336

(22) PCT Filed: Apr. 22, 2013

(86) PCT No.: PCT/KR2013/003411
§ 371 (c)(1),
(2) Date: Jun. 2, 2014

(87) PCT Pub. No.: WO2013/162234
PCT Pub. Date: Oct. 31, 2013

(65) Prior Publication Data
US 2015/0037711 A1     Feb. 5, 2015

(30) Foreign Application Priority Data

Apr. 23, 2012  (KR) .................. 10-2012-0042006

(51) Int. Cl.
*H01M 4/86*     (2006.01)
*B22F 9/24*     (2006.01)
(Continued)

(52) U.S. Cl.
CPC ........... *H01M 4/8657* (2013.01); *B01J 13/02* (2013.01); *B22F 1/0018* (2013.01); *B22F 1/025* (2013.01);
(Continued)

(58) Field of Classification Search
CPC .. B22F 1/025; B22F 9/24; B01J 31/02; B32B 15/02; B82B 3/00; B82Y 40/00; H01M 4/8657; H01M 4/921; H01M 4/928
See application file for complete search history.

(56) References Cited

U.S. PATENT DOCUMENTS

2003/0039860 A1   2/2003   Cheon et al.
2003/0190475 A1   10/2003  Carpenter et al.
(Continued)

FOREIGN PATENT DOCUMENTS

CN   101722304 A   6/2010
CN   102019431 A   4/2011
(Continued)

OTHER PUBLICATIONS

Ping-Ping Fang et al. "Tailoring Au-core Pd-shell Pt-cluster nanoparticles for enhanced electrocatalytic activity", Chemical Science, 2011, 2, pp. 531-539.
(Continued)

*Primary Examiner* — Jun Li
(74) *Attorney, Agent, or Firm* — Dentons US LLP

(57) ABSTRACT

The present application provides a method for fabricating core-shell particles, including: forming a first solution by adding a first metal salt and a first surfactant to a first solvent; forming core particles including a first metal included in the first metal salt by adding a first reducing agent to the first solution; forming a second solution by adding the core particles, a second metal salt, and a second surfactant to a second solvent; and forming core-shell par-
(Continued)

ticles by adding a second reducing agent to the second solution and forming shells on the surface of the core particle, in which the first surfactant and the second surfactant are polyoxyethylene, polyoxyethylene sorbitan monolaurate or polyoxyethylene oleyl ether, and core-shell particles fabricated by the method.

9 Claims, 7 Drawing Sheets

(51) Int. Cl.
  *B22F 1/02* (2006.01)
  *B01J 13/02* (2006.01)
  *H01M 4/92* (2006.01)
  *B22F 1/00* (2006.01)
  *B82Y 40/00* (2011.01)

(52) U.S. Cl.
  CPC .............. *B22F 9/24* (2013.01); *H01M 4/921* (2013.01); *H01M 4/928* (2013.01); *B82Y 40/00* (2013.01)

(56) References Cited

U.S. PATENT DOCUMENTS

| | | |
|---|---|---|
| 2004/0219361 A1 | 11/2004 | Cui et al. |
| 2005/0075240 A1* | 4/2005 | Yamamoto ................ 502/101 |
| 2006/0177660 A1* | 8/2006 | Kumar et al. ............... 428/403 |
| 2008/0078302 A1 | 4/2008 | Lee et al. |
| 2009/0311556 A1 | 12/2009 | Ganapathiraman et al. |
| 2010/0031848 A1 | 2/2010 | Lee et al. |
| 2010/0086832 A1* | 4/2010 | Lopez et al. ................ 429/44 |
| 2010/0105548 A1 | 4/2010 | Zhang et al. |
| 2011/0129763 A1 | 6/2011 | Lee et al. |
| 2012/0329642 A1* | 12/2012 | Shao ................ H01M 4/90 502/177 |

FOREIGN PATENT DOCUMENTS

| | | |
|---|---|---|
| EP | 2130627 A1 | 12/2009 |
| JP | 1978146989 A | 12/1978 |
| JP | 1998317022 A | 12/1998 |
| JP | 2005-196972 A | 7/2005 |
| JP | 2009242914 A | 10/2009 |
| KR | 10-2003-0015593 A | 2/2003 |
| KR | 10-0759715 B1 | 10/2007 |
| KR | 10-2008-0029729 A | 4/2008 |
| KR | 10-2010-0019867 A | 2/2010 |
| KR | 10-2011-0060589 A | 6/2011 |
| KR | 10-2011-0085299 A | 7/2011 |
| WO | 2010108837 A1 | 9/2010 |
| WO | WO2010108837 * | 9/2010 .............. B01J 13/00 |

OTHER PUBLICATIONS

Chao Wang et al. "Multimetallic Au/FePt3 Nanoparticles as Highly Durable Electrocatalyst" Nano Letters, Aug. 12, 2010, pp. 919-926.
Dong et al., "Photochemical synthesis of bimetallic Au—Ag nanoparticles with "core-shell" type structure by seed mediated catalytic growth", Trans. Nonferrous Met. Soc. China, Apr. 1, 2005, vol. 15, No. 2, pp. 310-313.

* cited by examiner

METHOD FOR FABRICATING CORE-SHELL PARTICLES AND CORE-SHELL PARTICLES FABRICATED BY THE METHOD

This application is a National Stage Application of International Application No. PCT/KR2013/003411, filed Apr. 22, 2013, and claims priority to and the benefit of Korean Application No. 10-2012-0042006, filed on Apr. 23, 2012, the disclosures of which are incorporated by reference herein in their entirety.

TECHNICAL FIELD

The present application relates to a method for fabricating core-shell particles and core-shell particles fabricated by the method.

BACKGROUND ART

Nano particles are particles having a nano-scaled particle size, and exhibit optical, electric, and magnetic characteristics completely different from those of a bulk-state material due to a quantum confinement effect in which the energy required for electron transfer is changed depending on the size of material, and a large specific surface area. Thus, due to these properties, much interests have been focused on the applicability in the fields of catalysts, electro-magnetics, optics, medicine, and the like. Nano particles may be an intermediate between bulk and molecule, and in terms of an approach in two ways, that is, a "Top-down" approach and a "Bottom-up" approach, it is possible to synthesize nano particles.

Examples of a method for synthesizing metal nano particles include a method for reducing metal ions with a reducing agent in a solution, a method using gamma rays, an electrochemical method, and the like. However, methods in the related art are problematic in that it is difficult to synthesize nano particles having a uniform size and shape, or the use of an organic solvent leads to environmental pollution, high costs, and the like. For these various reasons, it was difficult to economically mass-produce high-quality nano particles.

[Nano Lett., 2011, 11(3), pp 919 to 926] describes a method for fabricating core-shell particles including gold (Au) as a core and platinum (Pt) as a shell, but discloses only a method of fabricating core-shell particles using platinum (Pt)-acetylacetonate (Pt-(acac)$_2$) which is an organic metal compound and an organic solvent, not a method of fabricating core-shell particles which may solve the problem of environmental pollution or high costs.

PRIOR ART REFERENCE

Korean Laid-Open Publication No. 10-2003-0015593
Nano Lett., 2011, 11(3), pp 919-926

DISCLOSURE

Technical Problem

The present application has been made in an effort to provide a method of fabricating core-shell particles which does not cause environmental pollution during fabrication and may easily achieve mass production at relatively low costs.

The present application has been made in an effort to provide core-shell particles fabricated by the fabrication method.

The present application has been made in an effort to provide a catalyst for a fuel cell including core-shell particles fabricated by the fabrication method and a fuel cell including the same.

The problems of the present application to be solved are not limited to the aforementioned technical problems, and other technical problems, which are not mentioned, may be obviously understood by a person with ordinary skill in the art from the following description.

Technical Solution

An exemplary embodiment of the present application provides a method for fabricating core-shell particles, the method comprising:
forming a first solution including a first metal salt, a first surfactant, and a first solvent;
forming core particles including a first metal included in the first metal salt by adding a first reducing agent to the first solution;
forming a second solution including the core particles, a second metal salt, a second surfactant, and a second solvent; and
forming core-shell particles by adding a second reducing agent to the second solution and forming a shell on the surface of the core particle, in which the first surfactant and the second surfactant are polyoxyethylene, polyoxyethylene sorbitan monolaurate or oleyl ether.

Another exemplary embodiment of the present application provides core-shell particles fabricated by the fabrication method, comprising: a core including a first metal; and a shell including a second metal.

Yet another exemplary embodiment of the present application provides core-shell particles fabricated by the fabrication method, comprising: a core including a first metal; a first shell including a second metal; and a second shell including a third metal.

Still another exemplary embodiment of the present application provides a catalyst for a fuel cell comprising core-shell particles fabricated by the fabrication method.

Still yet another exemplary embodiment of the present application provides a fuel cell comprising the catalyst for a fuel cell.

Advantageous Effects

According to the present application, provided are a method of fabricating core-shell particles, which does not cause environmental pollution and may easily achieve mass production at relatively low costs, and core-shell particles fabricated by the method.

MODE FOR INVENTION

Figure 1:
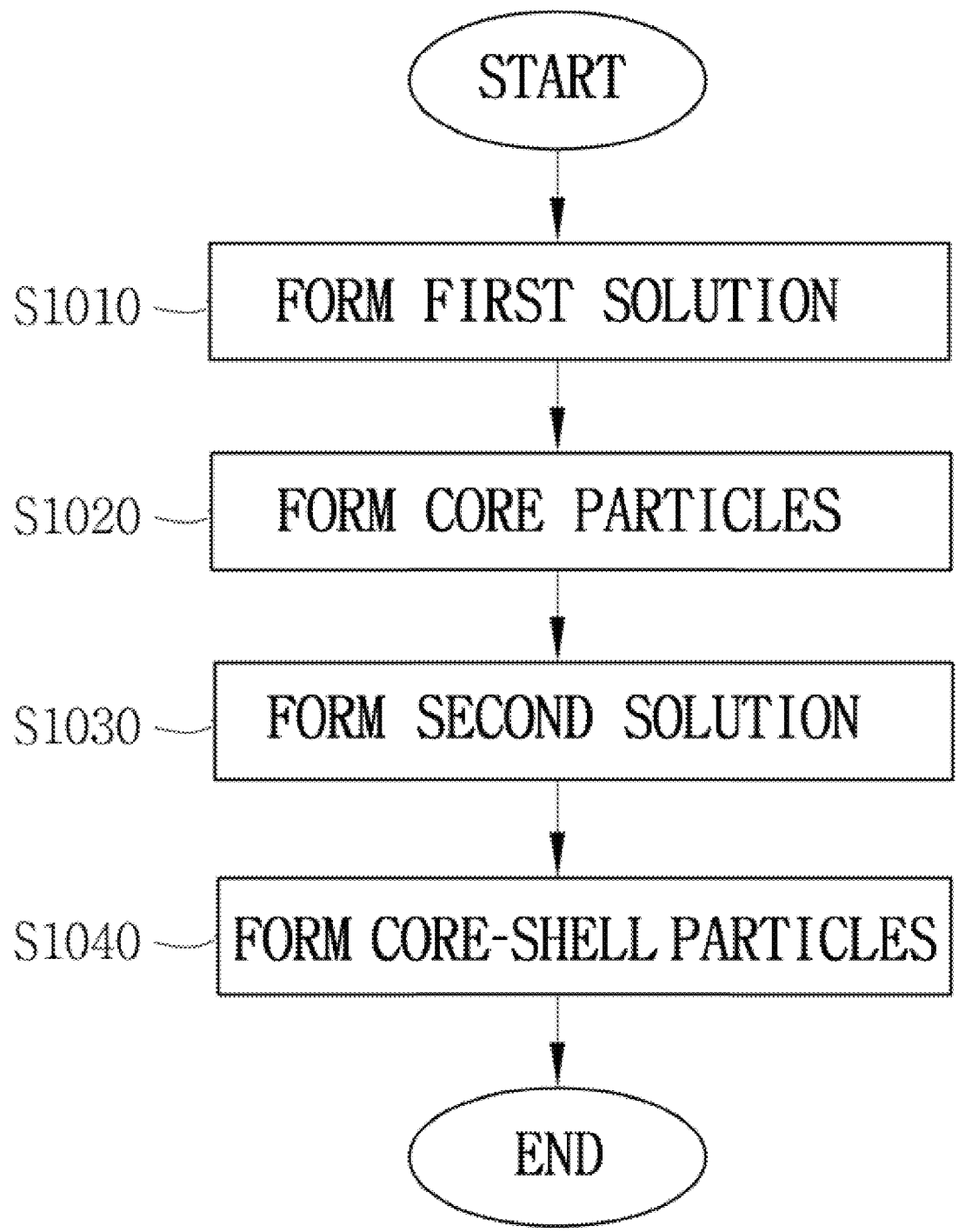
FIGS. 1 and 2 are flowcharts illustrating a method for fabricating core-shell particles according to an exemplary embodiment of the present application.

The advantages and features of the present application, and methods of accomplishing these will become obvious with reference to the exemplary embodiments to be described below in detail along with the accompanying drawings. However, the present application is not limited to exemplary embodiments to be disclosed below, but various forms different from each other may be implemented. The exemplary embodiments are merely provided to make the disclosure of the present application complete and to completely notify the person with ordinary skill in the art to which the present application pertains, of the scope of the invention, and the present application may be only defined by the scope of the claims. The size and relative size of the constituent elements marked in the drawings may be exaggerated for clarity of description.

Unless otherwise defined, all terms (including technical and scientific terms) used in the present specification may be used as the meaning which may be commonly understood by the person with ordinary skill in the art to which the present application pertains. It will be further understood that terms defined in commonly used dictionaries should not be interpreted in an idealized or excessive sense unless expressly and specifically defined.

Hereinafter, referring to FIGS. 1 to 8, a method of fabricating core-shell particles according to an exemplary embodiment of the present application will be described.

Figure 2:
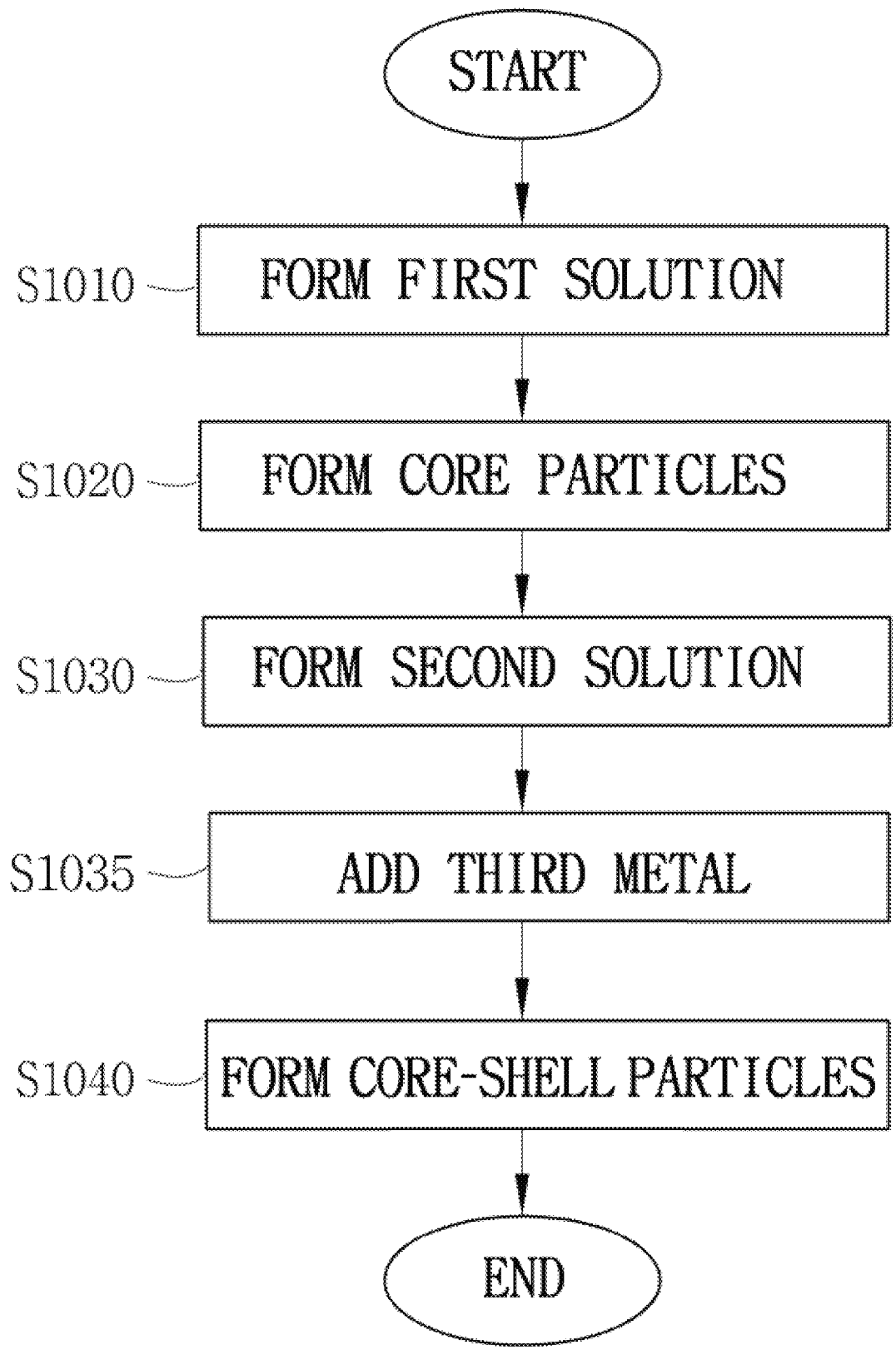

FIGS. 1 and 2 are flowcharts illustrating a method of fabricating core-shell particles according to an exemplary embodiment of the present application.

First, referring to FIG. 1, a first solution including a first metal salt, a first surfactant, and a first solvent is formed (S1010).

In the exemplary embodiment of the present application, the first metal salt is not particularly limited as long as the first metal salt may be ionized in a solution to provide metal ions. The first metal salt may include a first metal.

Here, the first metal may be at least one selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu). Specifically, the first metal may be selected from the group consisting of ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), cerium (Ce), silver (Ag), and copper (Cu), and more specifically, may be palladium (Pd).

The first metal salt may be, for example, nitrate ($NO_3^-$) of the first metal, halide of the first metal such as chloride ($Cl^-$), bromide ($Br^-$), and iodide ($I^-$), hydroxide ($OH^-$) of the first metal, or sulfate ($SO_4^-$) of the first metal, but is not limited thereto.

According to the exemplary embodiment of the present application, the first solvent may be a solvent including water. Specifically, in the exemplary embodiment of the present application, the first solvent serves to dissolve the first metal salt, and the first solvent may be water or a mixture of water and a $C_1$ to $C_6$ alcohol, more specifically water.

When an organic solvent is used as the solvent, there is a problem in that fabrication needs to be performed at a high temperature exceeding 100° C. Since an interface of the core-shell particles fabricated is hydrophobic, the particles are aggregated with each other when the core-shell particles are immersed in water, and thus are not dispersed in water. Accordingly, since the core-shell particles may not be used while dispersed in water, there is a problem in that the application thereof is limited. However, the present application uses water as the first solvent, and thus is advantageous in that the first solution may be formed at low temperature, specifically in a temperature range from 25° C. to 100° C. More specifically, the first solution of the present application may be formed in a temperature range from 50° C. to 95° C., or from 65° C. to 95° C. Accordingly, there is an advantage in that no environmental pollution is caused, and there is an effect of reducing costs because mass production may be achieved at low costs. Since the core-shell particles may be used while dispersed in water, there is an advantage in that various applications thereof are possible.

In the exemplary embodiment of the present application, the first surfactant is not particularly limited, but may be preferably a non-ionic surfactant. The non-ionic surfactant is preferred because the surfactant does not include metal components as impurities. Furthermore, the non-ionic surfactant is advantageous in that the hydrophilic lipophilic balance (HLB) may be relatively freely controlled. Thus, according to physical properties of the first solvent, it is possible to control the hydrophilic lipophilic balance such as increasing hydrophilicity and decreasing lipophilicity, or decreasing hydrophilicity and increasing lipophilicity, thereby maximizing the utilization of the first surfactant.

The first surfactant may form a micelle including hydrophilic branches in the first solvent. The first metal salt may be entrapped in the hydrophilic branches of the micelle. Thus, the first metal salt dissolved in the first solvent may be uniformly dispersed in the first solution. In addition, the first metal salt may be uniformly dispersed in the first solution, thereby forming uniformly-sized core particles.

The first surfactant may be, for example, polyoxyethylene, polyoxyethylene sorbitan monolaurate or polyoxyethylene oleyl ether. Here, the repetition number of oxyethylene units included in polyoxyethylene, polyoxyethylene sorbitan monolaurate or polyoxyethylene oleyl ether may be from 10 to 25. When the repetition number of oxyethylene units is less than 10, dispersion force that may disperse the first metal salt in the first solution becomes weak, and thus it may be difficult to uniformly disperse the first metal salt. When the repetition number of oxyethylene units exceeds 25, the first metal salt may be dispersed in the first solution, but the repetition number is not preferred from the economical viewpoint.

In the exemplary embodiment of the present application, when water is selected as the first solvent, the concentration of the first surfactant may be two times to ten times the critical micelle concentration (CMC) to water in the first solution.

When the concentration of the first surfactant is two times less than the critical micelle concentration, the concentration of the first surfactant adsorbed to the first metal salt may be relatively decreased. Accordingly, the amount of core particles formed may also be entirely decreased, and core particles may be aggregated. Meanwhile, when the concentration of the first surfactant exceeds ten times the critical micelle concentration, the concentration of the first surfactant adsorbed to the first metal salt is relatively increased, which may not be preferred from the viewpoint of economic benefits of the process, but it is advantageous in terms of dispersibility of particles when the concentration of the first surfactant is ten times less than the critical micelle concentration.

In the exemplary embodiment of the present application, the first solution may be formed in a temperature range from 25° C. to 100° C. Specifically, the first solution may be formed in a temperature range from 50° C. to 95° C., or from 65° C. to 95° C. When the temperature at which the first solution is formed is less than 25° C., the first metal salt, the first surfactant, and the solvent may not be sufficiently mixed. The first solution is sufficiently formed in a temperature range of 100° C. or less. The temperature range is an advantage obtained by using water as the solvent. Therefore, there is an advantage in the process in that it is possible to prevent environmental pollution, reduce costs, and achieve mass production. However, when the solution is formed using an organic solvent, the process needs to be performed at a high temperature exceeding 100° C., and thus there are problems in that a lot of costs are required and a solvent used for preventing environmental pollution needs to be subjected to post-treatment.

Subsequently, cores including the first metal included in the first metal salt are formed by adding a first reducing agent to the first solution (S1020).

As the first reducing agent used in the exemplary embodiment of the present application, a weak reducing agent having a standard reduction potential from −0.2 V to −0.05 V may be used. When the standard reduction potential of the first reducing agent is less than −0.2 V, a reduction rate of the first metal salt becomes so fast that the size of core particles including the first metal may be non-uniform, or core particles may not be formed. Meanwhile, when the standard reduction potential exceeds −0.05 V, the reduction rate of the first metal salt becomes so slow that core particles including the first metal may also be slowly formed, thereby leading to deterioration in economic benefits. The first reducing agent may be at least one selected from the group consisting of ascorbic acid, diol compounds, citric acid, fructose, amine compounds, α-hydroxy ketone compounds, succinic acid, and maltose.

In the exemplary embodiment of the present application, the first metal salt is reduced at a predetermined rate by the first reducing agent, and then formed as nano-sized core particles including the first metal. In this case, the particle diameter of the core particles may be from 1 nm to 200 nm. For example, when the first metal salt is $Na_2PdCl_4$ including palladium (Pd), $Pd^{+2}$ is reduced to $Pd^0$ by citric acid, and palladium nano particles having a particle diameter from 1 nm to 10 nm are formed.

In the exemplary embodiment of the present application, the core particles including the first metal may be formed in a temperature range from 25° C. to 100° C. by adding the first reducing agent to the first solution to reduce the first metal salt. Specifically, the first solution of the present application may be formed in a temperature range from 50° C. to 95° C., or from 65° C. to 95° C. When the temperature at which the core particles are formed is less than 25° C., the reduction rate of the first metal salt becomes so slow that the rate at which the core particles are formed may also become slow. When the temperature at which the core particles are formed exceeds 100° C., the first surfactant adsorbed to the interface of the first metal salt may be desorbed such that the dispersibility of the first metal salt may be reduced, and thus it may be difficult to form core particles having a uniform size.

In the forming of the core particles, the core particles may be formed by reacting the first reducing agent with the first metal salt in the first solution for a predetermined time, specifically from 10 minutes to 120 minutes, and more specifically from 30 minutes to 90 minutes.

According to the exemplary embodiment of the present application, the first metal salt may be metal nitrate, metal halide such as chloride ($Cl^-$), bromide ($Br^-$), and iodide ($I^-$), metal hydroxide, or metal sulfate. Because the core particles may be formed by reducing each of the metal salts in a temperature range from 25° C. to 100° C., the reduction reaction may be performed at a relatively lower temperature than when the core particles are formed by reducing a metal acetylacetonate-series or metal carbonyl-series precursor.

In the exemplary embodiment of the present application, the core particles including the first metal are formed, and then the first solution including the core particles may be centrifuged in order to precipitate the core particles included in the first solution. Only core particles separated after the centrifugation are collected. However, in some cases, the process may proceed to a step of forming a shell, which is the next step, without centrifugation. That is, it is possible to form a second solution including the first solution in which the core particles are formed, a second metal salt and a second surfactant, and a second solvent. Otherwise, a process of sintering core particles may be additionally performed, if necessary.

Subsequently, the second solution including the core particles, the second metal salt, the second surfactant, and the second solvent is formed (S1030).

In the exemplary embodiment of the present application, the second metal salt is not particularly limited as long as the second metal salt may be ionized in a solution to provide metal ions. The second metal salt may include a second metal. Here, the second metal may be at least one selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu). The second metal is specifically different from the first metal, and may be one selected from the group consisting of platinum (Pt), gold (Au), silver (Ag), and palladium (Pd).

In the exemplary embodiment of the present application, the second metal salt may be, for example, nitrate ($NO_3^-$) of the second metal, halide of the second metal such as chloride ($Cl^-$), bromide ($Br^-$), and iodide ($I^-$), hydroxide ($OH^-$) of the second metal, or sulfate ($SO_4^-$) of the second metal, but is not limited thereto.

According to the exemplary embodiment of the present application, the second solvent may be a solvent including water. Specifically, in the exemplary embodiment of the present application, the second solvent may be water or a mixture of water and a $C_1$ to $C_6$ alcohol, specifically water.

When an organic solvent is used as the solvent, there is a problem in that fabrication needs to be performed at a high temperature exceeding 100° C. Since the interface of core-shell particles fabricated is hydrophobic, the particles are aggregated with each other when the core-shell particles are immersed in water, and thus are not dispersed in water. Accordingly, since the core-shell particles may not be used while dispersed in water, there is a problem in that the application thereof is limited. However, the present application uses water as the second solvent, and thus is advantageous in that the second solution may be formed at low temperature, specifically, in a temperature range from 25° C. to 100° C. More specifically, the second solution of the present application may be formed in a temperature range from 50° C. to 95° C., or from 65° C. to 95° C. Accordingly, there is an advantage in that no environmental pollution is caused, and there is an effect of reducing costs because mass production may be achieved at low costs. Since the core-shell particles may be used while dispersed in water, there is an advantage in that various applications thereof are possible.

In the exemplary embodiment of the present application, the second surfactant is not particularly limited, but may be substantially the same as the first surfactant. That is, the second surfactant may be a non-ionic surfactant. The non-ionic surfactant is preferred because the surfactant does not include metal components as impurities. Furthermore, the non-ionic surfactant is advantageous in that the hydrophilic lipophilic balance (HLB) may be relatively freely controlled. Thus, according to physical properties of the second solvent, it is possible to control the hydrophilic lipophilic balance such as increasing hydrophilicity and decreasing lipophilicity, or decreasing hydrophilicity and increasing lipophilicity, thereby maximizing the utilization of the second surfactant.

The second surfactant may be adsorbed to the surface of the core particles or the second metal salt. Since the second metal salt may be adsorbed to the surface of the core particles by the second surfactant, a complex of the core particles and the second metal salt may be formed. In this case, since the second surfactant is adsorbed to the surface of the second metal salt, the complex of the core particles and the second metal salt may be uniformly dispersed in the second solution. The complex of the core particles and the second metal salt may be uniformly dispersed in the second solution, thereby forming uniformly-sized core-shell particles.

Meanwhile, when water is selected as the second solvent, the concentration of the second surfactant may be two times to ten times the critical micelle concentration (CMC) to water in the second solution. The critical micelle concentration means a concentration during the time when electric conductivity is not increased anymore and a micelle cluster is formed even though the concentration of the surfactant dissolved in water is increased.

In the exemplary embodiment of the present application, when the concentration of the second surfactant is two times less than the critical micelle concentration, the concentration of the second surfactant adsorbed to the second metal salt may be relatively decreased, thereby reducing the possibility that the second metal salt and the core particles may be adsorbed to each other. As a result, the formation of the complex composed of the second metal salt and the core particles may also be relatively decreased. Accordingly, the amount of core-shell particles formed may also be entirely decreased. When the concentration of the second surfactant is two times less than the critical micelle concentration, the size of the core-shell particles formed may be increased to the nano-size or more. For example, when the core-shell particles may be used as a catalyst of a fuel cell, there is concern in that the efficiency of the catalyst may be reduced.

Meanwhile, when the concentration of the second surfactant exceeds ten times the critical micelle concentration, the concentration of the second surfactant adsorbed to the second metal salt may be relatively increased, and thus a complex composed of the second metal salt and the core particles may also be relatively sufficiently formed. However, the amount of the complex to be formed is saturated such that the complex may not be possibly formed any more, which may not be preferred from the viewpoint of the economic benefits of the process. Therefore, the concentration is advantageously ten times or less in terms of dispersibility of particles.

In the exemplary embodiment of the present application, the second surfactant may be, for example, polyoxyethylene, polyoxyethylene sorbitan monolaurate or polyoxyethylene oleyl ether. Here, the repetition number of oxyethylene units included in polyoxyethylene, polyoxyethylene sorbitan monolaurate or polyoxyethylene oleyl ether may be from 10 to 25. When the repetition number of oxyethylene units is less than 10, dispersion force that may disperse the second metal salt in the second solution becomes weak, and thus it may be difficult to uniformly disperse the second metal salt, and the size of particles is also increased. When the repetition number of oxyethylene units exceeds 25, the second metal salt may be dispersed in the second solution, but the repetition number is not preferred from the economical viewpoint.

In the exemplary embodiment of the present application, the second solution may be formed in a temperature range from 25° C. to 100° C. Specifically, the second solution of the present application may be formed in a temperature range from 50° C. to 95° C., or from 65° C. to 95° C. When the temperature at which the second solution is formed is less than 25° C., the core particles, the second metal salt, the second surfactant, and the solvent may not be sufficiently mixed, and thus the complex of the core particles and the second metal salt may not be sufficiently formed. When the temperature at which the second solution is formed exceeds 100° C., among the complexes, particularly, some complexes having a relatively weak bonding intensity of the core particles may be separated into the core particles and the second metal salt, and thus there is concern in that core-shell particles may not be sufficiently formed. The temperature range is an advantage obtained by using water as the solvent. Therefore, there is an advantage in the process in that it is possible to prevent environmental pollution, reduce costs, and achieve mass production. However, when the solution is formed using an organic solvent, the process needs to be performed at a high temperature exceeding 100° C., and thus there are problems in that a lot of costs are required and a solution used for preventing environmental pollution needs to be subjected to post-treatment.

Subsequently, core-shell particles are formed by adding a second reducing agent to the second solution and forming shells on the surface of the core particle (S1040).

In the exemplary embodiment of the present application, the shell may be a shell including the second metal included in the second metal salt. In this case, core-shell particles having a two-layer structure may be formed.

As the second reducing agent used in the exemplary embodiment of the present application, a weak reducing agent having a standard reduction potential from −0.2 V to −0.05 V may be used. That is, a reducing agent substantially the same as the first reducing agent may be used as the second reducing agent.

When the standard reduction potential of the second reducing agent is less than −0.2 V, the reduction rate of the second metal salt becomes so fast that the thickness of the shell including the second metal may be non-uniform. Meanwhile, when the standard reduction potential exceeds −0.05 V, the reduction rate of the second metal salt becomes so slow that the shell including the second metal may also be slowly formed, thereby leading to deterioration in economic benefits. The second reducing agent may be at least one selected from the group consisting of ascorbic acid, diol compounds, citric acid, fructose, amine compounds, α-hydroxy ketone compounds, succinic acid, and maltose.

In the exemplary embodiment of the present application, the second metal salt is reduced at a predetermined rate by the second reducing agent, and then formed as a nano-sized shell including the second metal. Thus, the shell including the second metal may be formed on the surface of the aforementioned core particles including the first metal, thereby forming core-shell particles. The shell may be present in at least one region of the outer surface of the core particle, and may cover the entire surface of the core particle. The fabrication method has an advantage in that core-shell particles having a uniform nano size may be formed.

In the forming of the core-shell particles, the shell may be formed on the surface of the core by reacting the second reducing agent with the second metal salt in the second solution for a predetermined time, specifically from 10 minutes to 120 minutes, and more specifically from 30 minutes to 90 minutes.

In the exemplary embodiment of the present application, the fabrication method may further include adding a third metal salt to the second solution (S1035) after the forming of the second solution (S1030) and before the forming of the core-shell particles (S1040). Specifically, the third metal salt may be added to the second solution from 5 minutes to 2 hours, more specifically from 10 minutes to 1 hour, and even more specifically from 20 minutes to 40 minutes after the second solution is formed.

The core-shell particles are formed by adding the third metal salt to the second solution, adding the second reducing agent to the second solution, and then forming shells on the surface of the core particle (S1040). Specifically, the second reducing agent may be added to the second solution from 5 minutes to 2 hours, more specifically from 10 minutes to 1 hour, and even more specifically from 20 minutes to 40 minutes after the third metal salt is added.

In the exemplary embodiment of the present application, the core-shell particle may be a particle composed of a core, a first shell, and a second shell. In this case, the first shell includes the second metal included in the second metal salt, and the second shell includes the third metal included in the third metal salt. Specifically, the second shell may be an alloy of the first metal and the third metal.

The first shell may be present in at least one region of the outer surface of the core, and may be present in the form of surrounding the outer surface of the core.

The second shell may be present in at least one region of the outer surface of the first shell, and may be present in the form of surrounding the entire surface of the outer surface of the first shell.

In the forming of the core-shell particles having a three-layer structure, the first shell and the second shell may be formed on the surface of the core by reacting the second reducing agent with the second metal salt and the third metal salt in the second solution for a predetermined time, specifically from 10 minutes to 120 minutes, and more specifically from 30 minutes to 90 minutes.

In the exemplary embodiment of the present application, the third metal may be at least one selected from the group consisting of platinum (Pt), ruthenium (Ru), rhodium (Rh), molybdenum (Mo), osmium (Os), iridium (Ir), rhenium (Re), palladium (Pd), vanadium (V), tungsten (W), cobalt (Co), iron (Fe), selenium (Se), nickel (Ni), bismuth (Bi), tin (Sn), chromium (Cr), titanium (Ti), gold (Au), cerium (Ce), silver (Ag), and copper (Cu). Specifically, the third metal is different from the second metal. Specifically, the third metal may be platinum (Pt), ruthenium (Ru), rhodium (Rh) or iridium (Ir).

The third metal salt may be, for example, nitrate ($NO_3^-$) of the third metal, halide of the third metal such as chloride ($Cl^-$), bromide ($Br^-$), and iodide ($I^-$), hydroxide ($OH^-$) of the third metal, or sulfate ($SO_4^-$) of the third metal, but is not limited thereto.

When the core-shell particle is a particle composed of the core, the first shell, and the second shell, the first shell is substituted and formed by a reduction potential difference between the core metal and the second metal salt in the forming of the second solution (S1030). While the first shell is formed, some of core ions substituted are released. Thereafter, when the third metal salt is added in the adding of the third metal salt to the second solution (S1035) and the second reducing agent is added in the forming of the core-shell particles (S1040), the core metal ions and the third metal salt are simultaneously reduced by the second reducing agent, thereby forming the second shell having an alloy form. When the second reducing agent is added before the third metal salt is added to the second solution, the second reducing agent may remain in an excessive amount in the solution after the first shell is formed. Thereafter, when the third metal salt is added, the third metal salt is directly reduced by the reducing agent which remains in the solution, thereby forming a metal particle and making it difficult to form the second shell.

Thus, the first shell including the second metal may be formed on the surface of the aforementioned core particle including the first metal and the second shell including the third metal may be formed on the surface of the first shell, thereby forming core-shell particles having a three-layer structure. The core-shell particle is advantageous in a particle having a uniform nano size.

In the exemplary embodiment of the present application, the core-shell particles may have an average particle diameter from 2 nm to 500 nm, specifically from 2 nm to 400 nm, and more specifically from 2 nm to 90 nm. In this case, the particle diameter of the core particles may be from 1 nm to 200 nm, specifically from 1 nm to 50 nm. In addition, the shell may have a thickness from 0.5 nm to nm, specifically from 0.5 nm to 10 nm. For example, when the second metal salt is $HAuCl_4$ including gold (Au), $Au^{+3}$ is reduced to $Au^0$ by citric acid, and a gold (Au)-containing shell having a thickness from 0.5 nm to 10 nm may be formed.

In the case of a two-layered core-shell particle having a core-shell structure, the particle diameter of the core particle may be from 1 nm to 200 nm and the thickness of the shell covering the surface of the core particle may be from 0.5 nm to 50 nm, and thus the particle diameter of the core-shell particle finally formed may be entirely from 2 nm to 300 nm. Specifically, the particle diameter of the core particle may be from 1 nm to 50 nm and the thickness of the shell covering the surface of the core particle may be from 0.5 nm to 10 nm, and thus the particle diameter of the core-shell particle finally formed may be entirely from 2 nm to 70 nm.

In the case of a three-layered core-shell particle having a core-first cell-second shell structure, the particle diameter of the core may be from 1 nm to 200 nm, specifically from 1 nm to 50 nm, the thickness of the first shell covering the surface of the core particle may be from 0.5 nm to 50 nm, specifically from 0.5 nm to 10 nm, and the thickness of the second shell covering the surface of the first shell may be from 0.5 nm to 50 nm, specifically from 0.5 nm to 10 nm, and thus the particle diameter of the core-shell particle finally formed may be entirely from 3 nm to 400 nm, specifically from 3 nm to 90 nm.

According to the exemplary embodiment of the present application, it may be difficult to form core-shell particles having a particle diameter less than 2 nm, and when the particle diameter of the core-shell particle is 500 nm or less, there is a big advantage in that nano particles may be used in various fields. In the case where the particle diameter of the core-shell particle is 90 nm or less, when the core-shell particles formed are used as, for example, a catalyst of a fuel cell, the efficiency of the fuel cell may be significantly enhanced.

The particle diameter of the plurality of core-shell particles formed in the exemplary embodiment of the present application may be within a range from 80% to 120% of the average particle diameter of the core-shell particles. Specifically, the particle diameter of the core-shell particle may be within a range from 90% to 110% of the average particle diameter of core-shell particles. When the particle diameter is out of the range, the size of the core-shell particle is entirely irregular, and thus it may be difficult to secure an intrinsic physical property value required by the core-shell particles. For example, when core-shell particles out of a range from 80% to 120% of the average particle diameter of the core-shell particles are used as a catalyst of a fuel cell, the effect of improving the efficiency of the fuel cell may be a little insufficient.

In the exemplary embodiment of the present application, core-shell particles having a two-layer structure or a three-layer structure may be formed in a temperature range from 25° C. to 100° C. by adding the second reducing agent to the second solution. Specifically, the core-shell particles having a two-layer structure or a three-layer structure of the present application may be formed in a temperature range from 50° C. to 95° C., or from 65° C. to 95° C. When the temperature at which the core-shell particles are formed is less than 25° C., the reduction rate of the second metal salt becomes so slow that the rate at which the core-shell particles are formed may also become slow. When the temperature at which the core-shell particles are formed exceeds 100° C., the second surfactant adsorbed to the interface of the second metal salt or the surface of the core particle may be desorbed such that the dispersibility of the complex by the second metal salt and the core particles may be reduced, and thus it may be difficult to form core-shell particles having a uniform size.

According to the exemplary embodiment of the present specification, the forming of the first solution may be performed in a temperature range from 85° C. to 95° C., the forming of the second solution may be performed in a temperature range from 75° C. to 95° C., and the forming of the core-shell particles may be performed in a temperature range from 65° C. to 75° C.

According to the exemplary embodiment of the present application, the first metal salt, the second metal salt, and the third metal salt may be metal nitrate; metal halide such as metal chloride, metal bromide, and metal iodide; metal hydroxide; or metal sulfate, and may be formed as core-shell particles by reducing each of the metal salts in a temperature range from 25° C. to 100° C. Thus, the reduction reaction may be performed at a relatively lower temperature than when core-shell particles are formed by reducing a metal acetylacetonate-series or metal carbonyl-series precursor. Further, it is possible to form a core-shell particle exhibiting physical properties which is the same as those of the core-shell particle formed by reducing a metal acetylacetonate-series or metal carbonyl-series precursor. That is, core-shell particles may be formed under milder conditions, and thus the method according to the exemplary embodiment of the present application is more advantageous than the existing methods from the economical viewpoint of the process.

In the exemplary embodiment of the present application, the core-shell particles are formed, and then the second solution including the core-shell particles may be centrifuged in order to precipitate the core-shell particles included in the second solution. Only core-shell particles separated after the centrifugation are collected. If necessary, a process of sintering the core-shell particles may be additionally performed.

Another exemplary embodiment of the present application provides core-shell particles fabricated by the fabrication method.

The core-shell particle may be a core-shell particle having a two-layer structure which includes a core including a first metal and a shell including a second metal. The average particle diameter of the core-shell particles may be from 2 nm to 300 nm.

The shell in the core-shell particle having a two-layer structure may be present in at least one region of the outer surface of the core, and may be present in the form of surrounding the entire surface of the outer surface of the core.

Yet another exemplary embodiment of the present application provides core-shell particles which may be a core-shell particle having a three-layer structure composed of a core including a first metal, a first shell including a second metal, and a second shell including a third metal. The average particle diameter of the core-shell particles may be from 3 nm to 400 nm.

The first shell in the core-shell particle having a three-layer structure may be present in at least one region of the outer surface of the core, and may be present in the form of surrounding the outer surface of the core.

The second shell may be present in at least one region of the outer surface of the first shell, and may be present in the form of surrounding the outer surface of the first shell.

Still another exemplary embodiment of the present specification provides a catalyst for a fuel cell including core-shell particles fabricated by the fabrication method.

Still yet another exemplary embodiment of the present specification provides a fuel cell including the catalyst for a fuel cell.

Specifically, the catalyst for a fuel cell may be included in a fuel cell electrode.

The fuel cell may be composed of a cathode as an air electrode, an anode as a hydrogen electrode and an electrolyte membrane, and oxygen reduction reaction (ORR), which occurs in the cathode as an air electrode among them, may be a rate determining step (RDS) of the total fuel cell reactions.

According to the exemplary embodiment of the present specification, the catalyst for a fuel cell including the core-shell particles may be included in the cathode to decrease strong bonding force between anions of the core-shell particles and an intermediate reactant (OH) generated during oxygen reduction, thereby increasing the activity of the oxygen reduction reaction.

Hereinafter, the present application will be described in detail with reference to Examples for a specific description. However, the Examples according to the present application may be modified in various forms, and the scope of the present application is not interpreted as being limited to the Examples described in detail below. The Examples of the present application are provided for more completely explaining the present application to those skilled in the art.

Example 1

A first solution was formed by adding 50 mg of $Na_2PdCl_4$, which is a Pd precursor, as a first metal salt, and 50 mg of polyoxyethylene(20) oleyl ether having the repetition number of oxyethylene units of 20, as a first surfactant, to 10 ml of water (distilled water) as a first solvent, and dissolving the mixture. Subsequently, after 60 mg of ascorbic acid and 60 mg of citric acid as a first reducing agent were dissolved in water in a temperature atmosphere of 90° C., the mixture was added to the first solution, and stirred for 1 hour. After the mixture was centrifuged at 10,000 rpm for 10 minutes, the supernatant in the upper layer thereof was discarded, the remaining precipitate was re-dispersed in 20 ml of water, and then the centrifugation process was repeated once more to form core particles including palladium (Pd).

Subsequently, a second solution was formed by adding 10 mg of the core particles including palladium (Pd), 40 mg of $HAuCl_4$ as a second metal salt, and 40 mg of polyoxyethylene(20) oleyl ether having the repetition number of oxyethylene units of 20, as a second surfactant, to 4 ml of water (distilled water) as a second solvent, in a temperature atmosphere of 80° C., and dissolving the mixture. In this case, the calculated concentration of the polyoxyethylene oleyl ether was approximately five times the critical micelle concentration to water. Subsequently, after 30 mg of citric acid and 30 mg of ascorbic acid as a second reducing agent were dissolved in water in a temperature atmosphere of 70° C., the mixture was added to the second solution, and stirred for 1 hour. After the mixture was centrifuged at 10,000 rpm for 10 minutes, the supernatant in the upper layer thereof was discarded, the remaining precipitate was re-dispersed in 20 ml of water, and then the centrifugation process was repeated once more to form core-shell particles composed of a core including palladium (Pd) and a shell including gold (Au).

Figure 3:
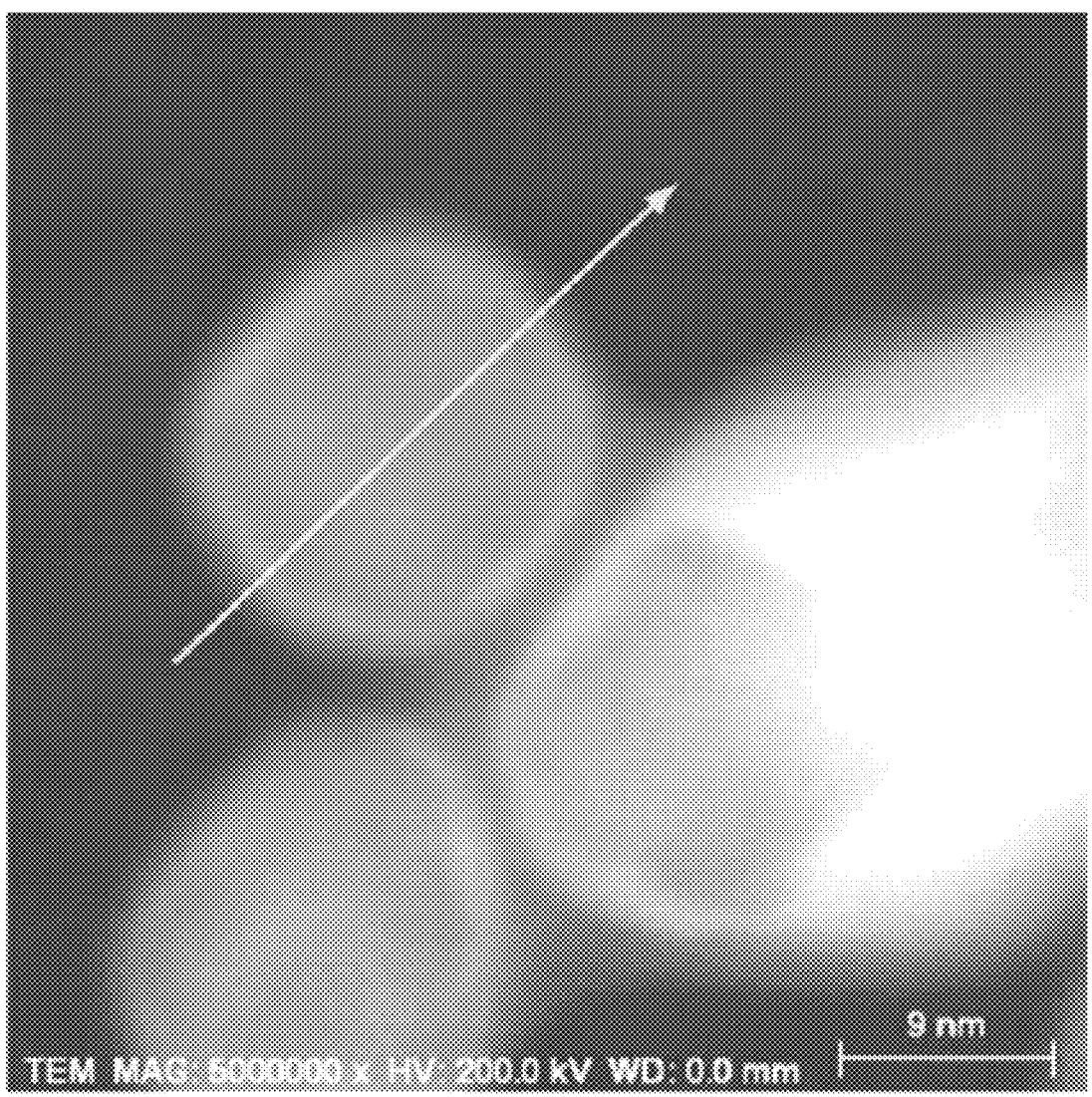
FIG. 3 illustrates a high-resolution transmission electron microscope (HR-TEM) image of core-shell particles fabricated according to Example 1.
Figure 4:
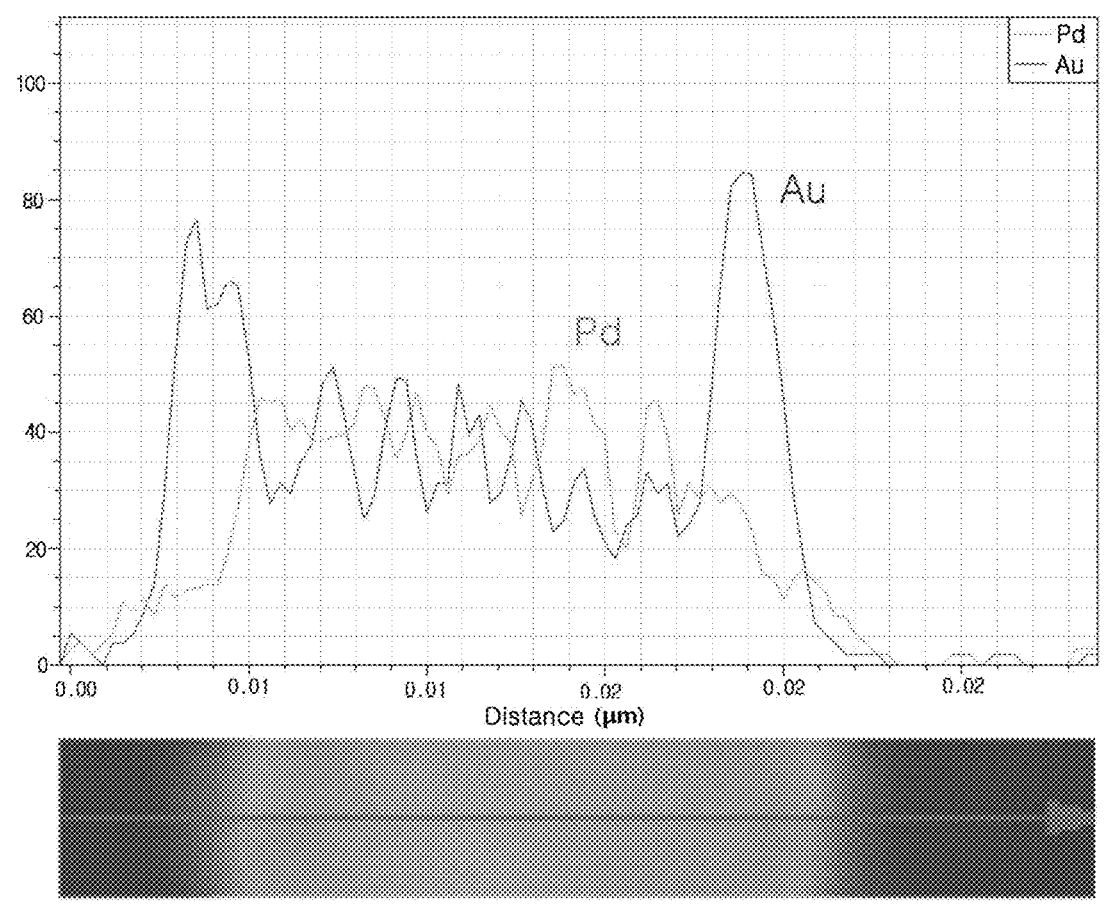
FIG. 4 illustrates a result of analyzing the content of elements positioned along the arrow line in the image of the single Pd—Au particle of FIG. 3.

FIG. 3 illustrates a structure analysis image of the Pd—Au particles on the core-shell particles using HR-TEM. FIG. 4 illustrates an electric data system (EDS) line scan profile as a result of analyzing the content of elements positioned along the line of the arrow in the image of the single Pd—Au particle of FIG. 3.

The particle diameter of core-shell particles obtained by a Scherrer equation calculation method on the HR-TEM of FIG. 3 was approximately 10 nm. The particle diameter of core-shell particles formed was measured on 200 or more core-shell particles using a graphic software (MAC-View) based on FIG. 3, the average particle diameter was 10 nm through a statistical distribution obtained, and the difference of the particle diameters to the average particle diameter was calculated within ±7.8%.

Example 2

Core-shell particles composed of a core including palladium (Pd) and a shell including platinum (Pt) were formed in the same manner as in Example 1, except that $K_2PtCl_4$ was used as the second metal salt. The average particle diameter of the core-shell particles formed by Example 2 was 22 nm, and the difference of the particle diameters to the average particle diameter was calculated within ±8.7%.

Example 3

Core-shell particles composed of a core including gold (Au) and a shell including platinum (Pt) were formed in the same manner as in Example 1, except that $HAuCl_4$ and $K_2PtCl_4$ were used as the first metal salt and the second metal salt, respectively. The average particle diameter of the core-shell particles formed by Example 3 was 21 nm, and the difference of the particle diameters to the average particle diameter was calculated within ±6.3%.

Example 4

A first solution was formed by adding 50 mg of $Na_2PdCl_4$, which is a Pd precursor, as a first metal salt, and 50 mg of polyoxyethylene(20) oleyl ether having the repetition number of oxyethylene units of 20, as a first surfactant, to 10 ml of water (distilled water) as a first solvent, and dissolving the mixture. Subsequently, after 60 mg of ascorbic acid and 60 mg of citric acid as a first reducing agent were dissolved in water in a temperature atmosphere of 90° C., the mixture was added to the first solution, and stirred for 1 hour. After the mixture was centrifuged at 10,000 rpm for 10 minutes, the supernatant in the upper layer thereof was discarded, the remaining precipitate was re-dispersed in 20 ml of water, and then the centrifugation process was repeated once more to form core particles including palladium (Pd).

Subsequently, a second solution was formed by adding 10 mg of the core particles including palladium (Pd), 40 mg of $HAuCl_4$ as a second metal salt, and 40 mg of polyoxyethylene(20) oleyl ether having the repetition number of oxyethylene units of 20, as a second surfactant, to 4 ml of water (distilled water) as a second solvent in a temperature atmosphere of 80° C., and dissolving the mixture. In this case, the calculated concentration of the polyoxyethylene oleyl ether was approximately five times the critical micelle concentration to water.

Subsequently, after 30 minutes, $K_2PtCl_4$ was added to the second solution.

Subsequently, after 30 minutes, 30 mg of citric acid and 30 mg of ascorbic acid as a second reducing agent were dissolved in water in a temperature atmosphere of 70° C., the mixture was added to the second solution, and stirred for 2 hours.

Subsequently, after the mixture was centrifuged at 10,000 rpm for 10 minutes, the supernatant in the upper layer thereof was discarded, the remaining precipitate was re-dispersed in 20 ml of water, and then the centrifugation process was repeated once more to form core-shell particles composed of a core including palladium (Pd), a first shell including gold (Au), and a second shell as an alloy of palladium (Pd) and platinum (Pt).

Figure 5:
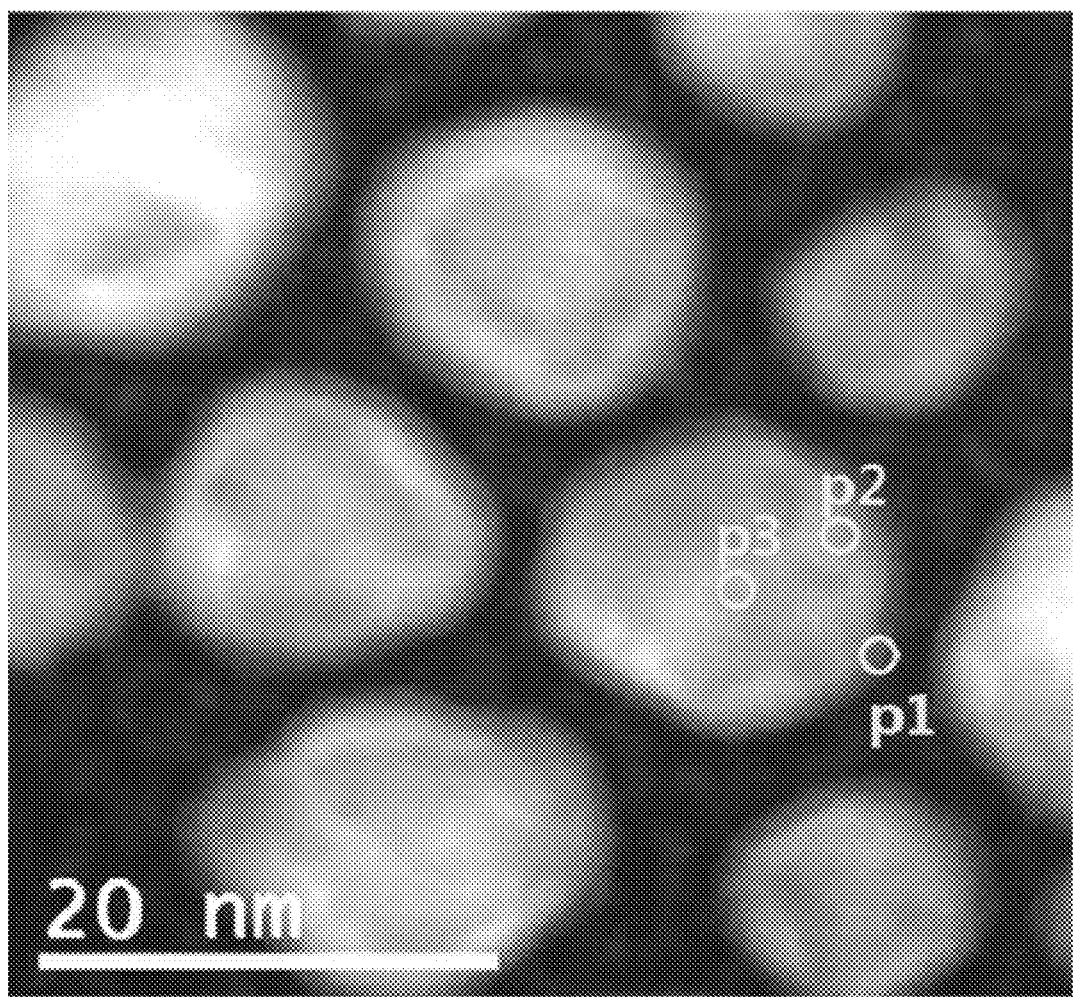
FIG. 5 illustrates an HR-TEM image of core-shell particles fabricated according to Example 4.

FIG. 5 illustrates a structure analysis image of alloy particles of the Pd—Au—Pd and Pt on the core-shell particles using HR-TEM.

The particle diameter of core-shell particles obtained by a Scherrer equation calculation method on the HR-TEM of FIG. 5 was approximately 10 nm. The particle diameter of core-shell particles formed was measured on 200 or more core-shell particles using a graphic software (MAC-View) based on FIG. 5, the average particle diameter was 10 nm through a statistical distribution obtained, and the difference of the particle diameters to the average particle diameter was calculated within ±5%.

The result obtained by subjecting the core point (p3), the first shell point (p2), and the second shell point (p3) in FIG. 5 to element analysis is shown in Table 1.

TABLE 1

| Spectrum (Atomic %) | Pd | Pt | Au |
|---|---|---|---|
| Point 1 | 55.97 | 25.96 | 18.07 |
| Point 2 | 25.68 | 4.95 | 69.37 |
| Point 3 | 67.38 | 2.69 | 29.93 |

Figure 6:
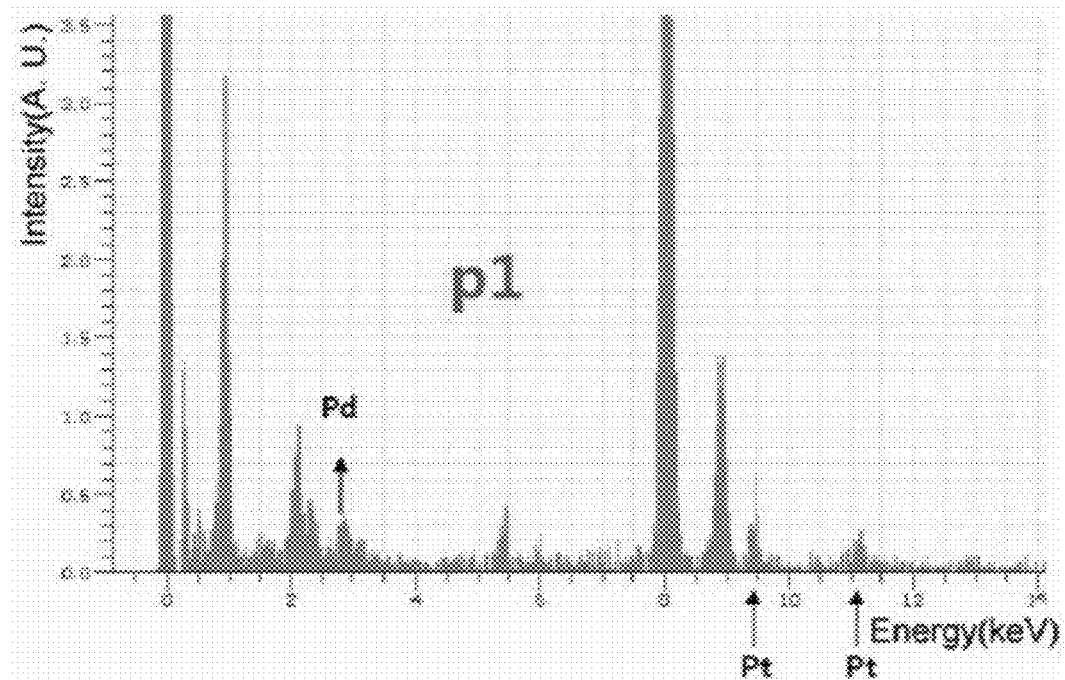
FIG. 6 illustrates an element analysis result at point p1 in the image of FIG. 5.
Figure 7:
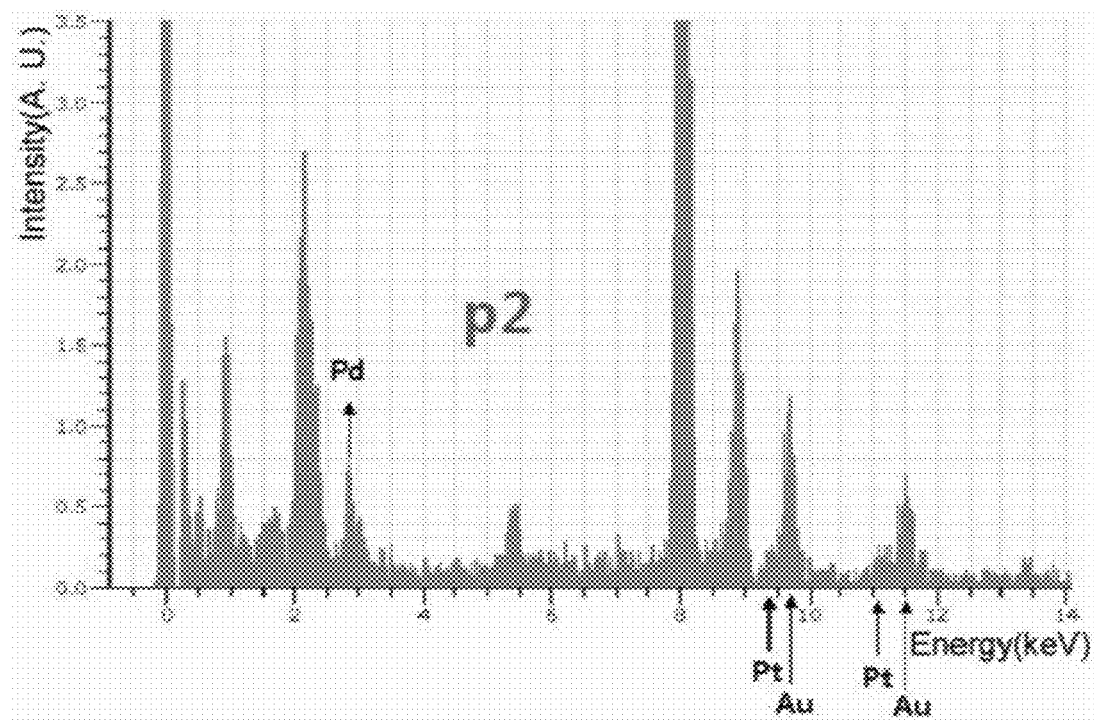
FIG. 7 illustrates an element analysis result at point p2 in the image of FIG. 5.
Figure 8:
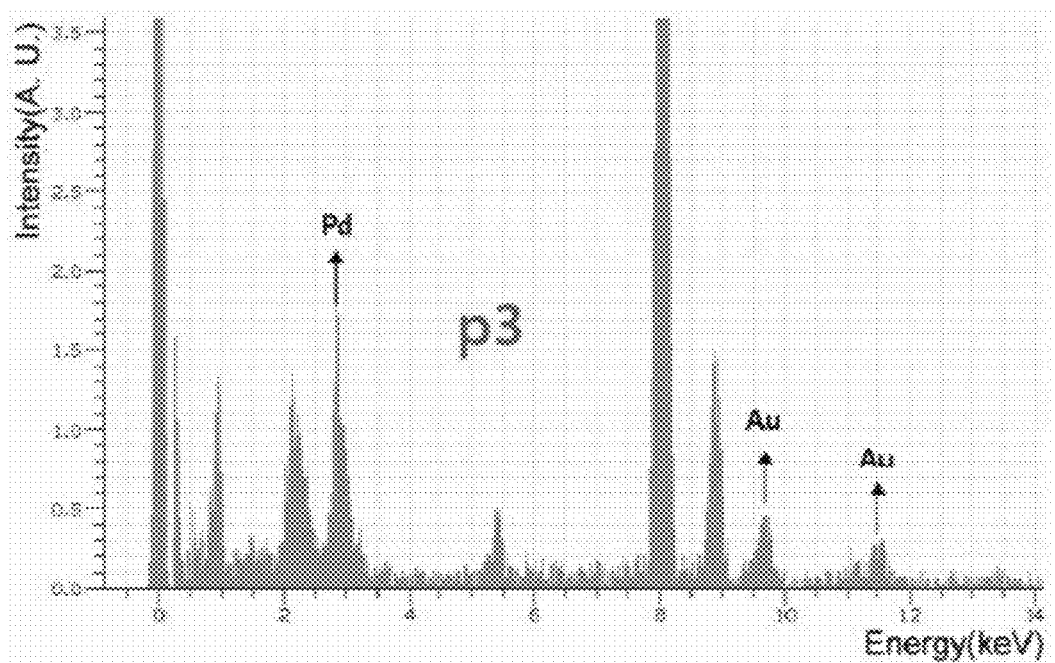
FIG. 8 illustrates an element analysis result at point p3 in the image of FIG. 5.

FIG. 6 illustrates an element analysis result at point p1 in the image of FIG. 5. FIG. 7 illustrates an element analysis result at point p2 in the image of FIG. 5. FIG. 8 illustrates an element analysis result at point p3 in the image of FIG. 5.

Comparative Example 1

A first solution was formed by adding 50 mg of $Na_2PdCl_4$ which is a Pd precursor, as a first metal salt, and 20 mg of polyoxyethylene(20) oleyl ether having the repetition number of oxyethylene units of 20, as a first surfactant, such that the concentration thereof is two times less than the CMC concentration, to 10 ml of water (distilled water) as a first solvent, and dissolving the mixture. Subsequently, after 60 mg of ascorbic acid and 60 mg of citric acid as a first reducing agent were dissolved in water in a temperature atmosphere of 90° C., the mixture was added to the first solution, and stirred for 1 hour. Pd metal particles after the reaction were aggregated and precipitated on the bottom of a reactor. The next reaction for forming the shell failed to proceed any more.

Comparative Example 2

1 mmol of palladium actylacetonate ($Pd(acac)_2$), which is a Pd precursor, as a first metal salt, 1 mmol of oleic acid and 4 mmol of oleylamine as a surfactant, and phenyl ether as a solvent were used, and 3 mmol of 1,2-hexadecanediol as a reducing agent was used. The precursor was completely dissolved at 100° C., but remained as a precursor state without being reduced even though the reducing agent had been put thereinto and then the mixture had been left to stand for 24 hours or more. Accordingly, when an organic solvent is used, it was confirmed that a core-shell particle failed to be formed at a temperature of 100° C. or less.

Comparative Example 3

1 mmol of palladium actylacetonate ($Pd(acac)_2$), which is a Pd precursor, as a first metal salt, 1 mmol of oleic acid and 4 mmol of oleylamine as a surfactant, and phenyl ether as a solvent were used, and 3 mmol of 1,2-hexadecanediol as a reducing agent was used. Pd particles were synthesized by increasing the temperature to 240° C. and reacting the mixture for 30 minutes at 240° C. Subsequently, 20 ml of ethanol was added thereto, the mixture was centrifuged, and then the resulting product was dissolved again in hexane. After the process of washing the mixture using ethanol was repeated two times, it could be confirmed that the solvent is not dissolved well in water when the solvent is replaced with water instead of hexane. Accordingly, since the interface of Pd particles produced was hydrophobic, it could be confirmed that it was difficult for the particles to be dissolved in water and used.

Application Example

The core-shell particles fabricated in the present application were applied to an electrode catalyst for a fuel cell air electrode. The fuel cell catalyst evaluation was conducted in a half cell system. As the electrode, a 3-electrode system, that is, a reference electrode, a counter electrode, and a working electrode, was used, the reference electrode was Ag/AgCl, and a 0.5 M sulfuric acid solution or a 0.1 M perchloric acid solution was used as an electrolyte.

In order to clean the surface of the catalyst, the surface was scanned from 15 times to 20 times at −0.2 V to 1.0 V and a scan rate of 20 mV/s using cyclic voltammetry.

A catalyst ink was prepared by mixing 2 mg of the catalyst, 8 μl of 5% nafion, 1.6 ml of EtOH, 0.4 ml of $H_2O$, and dispersing the mixture for 1 hour using an ultrasonic cleaner, and then 20 μl of the catalyst ink was coated on an RDE electrode and dried. The amount of the catalyst coated on the electrode was about 20 μg. The area of the electrode was 0.196 $cm^2$.

The 0.1 M perchloric acid solution was bubbled with pure oxygen for 30 minutes, and then circulated from the negative direction to the positive direction from 0.9 V to 0.4 V with reference to a normal hydrogen electrode (NHE), and the scan rate was 20 mV/s and the rotating rate of the electrode was from 1,600 to 2,500 RPM.

As the catalyst, a 45 wt % and 19.3 wt % Pt/C commercially available catalyst and the Pd@Au@PdPt/C prepared in the present specification were used. The following Table 2 shows a component ratio of the catalyst fabricated. The component ratio analysis was performed using ICP equipment.

TABLE 2

| | | Pt | Au | Pd |
|---|---|---|---|---|
| Pd@Au@PdPt/C_1 | Molar ratio | 0.18 | 0.2 | 0.62 |
| | Wt % | 4.3 | 4.9 | 8.3 |
| Pd@Au@PdPt/C_2 | Molar ratio | 0.13 | 0.26 | 0.61 |
| | Wt % | 4.3 | 8.6 | 11.1 |

The following Table 3 shows an activity result of an oxygen reduction reaction (ORR) at 0.8 V. Based on the Pt content, the activity per mass was 1.6 to 3.6 times higher, and based on the total metal content, a result equivalent thereto was obtained.

TABLE 3

| 0.8 V 0.1M $HClO_4$ | 45% Pt/C | 19.3% Pt/C | Pd@Au@PdPt/ C_2 | Pd@Au@PdPt/ C_1 |
|---|---|---|---|---|
| Mass activity (A/g-Pt) | 15 | 17.35 | 62.09 | 28.73 |
| Mass activity (A/g-metal) | 15 | 17.35 | 11.6 | 7.06 |

From the aforementioned result, it can be confirmed that the core-shell particles of the present specification may be used as a fuel cell air electrode catalyst.

The exemplary embodiments of the present application have been described with reference to the accompanying drawings, but the present application is not limited to the exemplary embodiments and may be prepared in various forms, and it will be understood by a person with ordinary skill in the art, to which the present application pertains, that the exemplary embodiments of the present application may be implemented in other specific forms without modifying the technical spirit or essential feature of the present application. Thus, it is to be appreciated that the exemplary embodiments described above are intended to be illustrative in every sense, and not restrictive.

The invention claimed is:

1. A method for fabricating core-shell particles, the method comprising:
    forming a first solution including a first metal salt, a first surfactant, and a first solvent;
    forming core particles including a first metal included in the first metal salt by adding a first reducing agent to the first solution;
    forming a second solution including the core particles, a second metal salt, a second surfactant, and a second solvent;
    adding a third metal salt to the second solution; and
    forming core-shell particles by adding a second reducing agent to the second solution and forming a shell on a surface of the core particle,
    wherein the first surfactant and the second surfactant are each independently polyoxyethylene, polyoxyethylene sorbitan monolaurate or polyoxyethylene oleyl ether,
    wherein the repetition number of oxyethylene units included in the polyoxyethylene, polyoxyethylene sorbitan monolaurate or polyoxyethylene oleyl ether is from 10 to 25,
    wherein the first solvent is water, and a concentration of the first surfactant is from two times to 10 times the critical micelle concentration to water in the first solution,
    wherein the second solvent is water, and a concentration of the second surfactant is from two times to 10 times the critical micelle concentration to water in the second solution,
    wherein the core-shell particles have an average particle diameter from 2 nm to 500 nm, and
    wherein a particle diameter of an individual core-shell particle is within a range of from 80% to 120% of the average particle diameter of the core-shell particles,
    wherein the core-shell particles are particles composed of a core, a first shell, and a second shell, wherein the first shell includes the second metal included in the second metal salt, and the second shell includes a third metal included in the third metal salt,
    wherein the first metal is palladium (Pd), the second metal is gold (Au), and the third metal is platinum (Pt), and
    wherein the second shell is an alloy of the first metal and the third metal.

2. The method of claim 1, wherein the first metal salt and the second metal salt are each independently metal nitrate, metal halide, metal hydroxide, or metal sulfate.

3. The method of claim 1, wherein the first reducing agent and the second reducing agent each independently have a standard reduction potential from −0.2 V to −0.05 V.

4. The method of claim 1, wherein the first reducing agent and the second reducing agent are the same as or different from each other, and are at least one selected from the group consisting of ascorbic acid, diol compounds, citric acid, fructose, amine compounds, α-hydroxy ketone compounds, succinic acid, and maltose.

5. The method of claim 4, wherein the first reducing agent and the second reducing agent are the same as each other.

6. The method of claim 1, wherein a particle diameter of the core is from 1 nm to 200 nm and a thickness of the shell is from 1 nm to 50 nm.

7. The method of claim 1, wherein the core-shell particles are fabricated in a temperature atmosphere from 25° C. to 100° C.

8. The method of claim 1, wherein the third metal salt is metal nitrate, metal halide, metal hydroxide, or metal sulfate.

9. The method of claim 1, wherein a particle diameter of the core is from 1 nm to 200 nm, a thickness of the first shell is from 1 nm to 50 nm, and a thickness of the second shell is from 1 nm to 50 nm.

* * * * *